United States Patent
Poslinski et al.

(10) Patent No.: US 7,290,698 B2
(45) Date of Patent: Nov. 6, 2007

(54) PROGRESS BAR WITH MULTIPLE PORTIONS

(75) Inventors: Thomas Poslinski, Elma, NY (US); Kim Annon Ryal, Mason, MI (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 491 days.

(21) Appl. No.: 10/925,546

(22) Filed: Aug. 25, 2004

(65) Prior Publication Data
US 2006/0045470 A1    Mar. 2, 2006

(51) Int. Cl.
*G06F 17/00* (2006.01)

(52) U.S. Cl. .................................. 235/375

(58) Field of Classification Search ........ 235/375, 235/381, 492, 454; 369/30.01; 386/68, 386/125, 46; 725/37, 115, 45, 34, 46, 38, 725/134
See application file for complete search history.

(56) References Cited

U.S. PATENT DOCUMENTS

| | | | |
|---|---|---|---|
| 6,091,886 A | 7/2000 | Abecassis | |
| RE37,000 E | 12/2000 | Shinyagaito et al. | |
| 6,177,931 B1 | 1/2001 | Alexander et al. | |
| 6,259,443 B1 | 7/2001 | Williams, Jr. | |
| 6,407,779 B1 | 6/2002 | Herz | |
| 6,564,005 B1 | 5/2003 | Berstis | |
| 6,744,967 B2 * | 6/2004 | Kaminski et al. | 386/46 |
| 6,748,596 B2 | 6/2004 | Knudson et al. | |
| 6,865,717 B2 * | 3/2005 | Wright | 715/772 |
| 2002/0044225 A1 | 4/2002 | Rakib | |
| 2003/0093790 A1 * | 5/2003 | Logan et al. | 725/38 |
| 2003/0121055 A1 * | 6/2003 | Kaminski et al. | 725/115 |
| 2004/0114475 A1 * | 6/2004 | Suzuki et al. | 369/30.08 |
| 2005/0071437 A1 * | 3/2005 | Bear et al. | 709/212 |
| 2006/0013555 A1 * | 1/2006 | Poslinski | 386/46 |
| 2006/0013557 A1 * | 1/2006 | Poslinski | 386/46 |
| 2006/0020966 A1 * | 1/2006 | Poslinski | 725/37 |
| 2006/0044951 A1 * | 3/2006 | Poslinski | 369/30.01 |
| 2006/0045470 A1 * | 3/2006 | Poslinski et al. | 386/68 |
| 2006/0048184 A1 * | 3/2006 | Poslinski et al. | 725/45 |

* cited by examiner

*Primary Examiner*—Thien Minh Le
(74) *Attorney, Agent, or Firm*—Steven L. Nichols; Rader, Fishman & Grauer PLLC

(57) ABSTRACT

A method and system for providing information about recorded media content having a beginning and end time. A progress bar including a first portion is displayed on a display device. The first portion graphically represents the duration of the recorded media content and has a first color. The progress bar also includes a second portion having a second color. The second portion graphically represents a section of the recorded media content that is viewed during a viewing session. The second color is distinct from the first color.

64 Claims, 12 Drawing Sheets

PROGRESS BAR WITH MULTIPLE PORTIONS

BACKGROUND

The advent of computers, interactive electronic communication, the Internet, and other advances in the digital realm of consumer electronics have resulted in a great variety of programming, recording, and viewing options for users who view media content such as television programs. In implementing such enhanced programming, the set-top box (STB) has become an important computing device for accessing media content services and the media content within those services. In addition to supporting traditional analog broadcast video functionality, STBs may also support an increasing number of two-way digital services such as video-on-demand and personal video recording.

An STB is typically connected to a cable or satellite, or generally, a subscriber television system, and includes hardware and software necessary to provide the functionality of the subscriber television system at the user's site. The STB typically includes a processor, communication components, and memory and is connected to a television or other display device, such as a personal computer. While many STBs are stand-alone devices that are externally connected to a television, an STB and/or its functionality may be integrated into a television or personal computer or even an audio device such as a programmable radio, as will be appreciated by those of ordinary skill in the art.

STBs are typically capable of providing users with a very large number and variety of media content choices. As the number of available media content choices increases, viewing conflicts arise whereby the user must choose between watching two or more media content instances (e.g. discrete, individual instances of media content such as, for a non-limiting example, a particular television show or "program"), all of which the user may like to view. Further, because of the large number of viewing choices, the user may miss viewing opportunities. Buffering of media content instances in memory or other storage device (e.g. hard disk drive) coupled to the STB has provided some relief from the conflict in viewing choices while providing personal video recording functionality. However, current buffering mechanisms for personal video recording are confusing to the user.

As mentioned, an STB may include a personal video recording (PVR) application that provides for media content recording functionality by enabling the temporary writing to, and if requested, more permanent recording to a storage device. A PVR application is also known as a Digital Video Recording (DVR) application. The PVR application may be integrated into the STB or it may be a stand-alone unit known as a personal video recorder. A typical PVR application allows the user to view the media content in trick play modes. Trick play modes allow the user to watch media content in a non-linear fashion by recording the media content in a temporary memory buffer, often called a live cache buffer, and then replaying the recorded media content in a manner other than a normal, sequential replay. Trick play modes include, but are not limited to, slow motion, fast motion, reverse play, fast forward play, instant replay, jumping, pausing of live broadcast, and scanning.

In a typical PVR application, a progress bar is a graphical tool that is used to illustrate how much media content has been recorded during a particular time window. The length of the progress bar may correspond to the amount of media content that has been recorded in a live cache buffer. However, a number of difficulties arise in operating a STB having a PVR application. For example, it is often difficult to distinguish between recorded media content that has been viewed by the user and recorded media content that has yet to be viewed by the user. Furthermore, progress bars currently do not graphically indicate a number of important informational facts about the recorded media content.

SUMMARY

In one of many possible embodiments, the present invention provides a method and system for providing information about recorded media content having a beginning and end time. A progress bar including a first portion is displayed on a display device. The first portion graphically represents the duration of the recorded media content and has a first color. The progress bar also includes a second portion having a second color. The second portion graphically represents a section of the recorded media content that is viewed during a viewing session. The second color is distinct from the first color.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

A method and system for providing information about recorded media content having a beginning and end time are described herein. A progress bar including a first portion is displayed on a display device. The first portion graphically represents the duration of the recorded media content and has a first color. The progress bar also includes a second portion having a second color. The second portion graphically represents a section of the recorded media content that is viewed during a viewing session. The second color is distinct from the first color. The progress bar may include a number of additional portions each having a distinct color and each providing additional information about the recorded media content.

In the following description, for purposes of explanation, numerous specific details are set forth in order to provide a thorough understanding of the present system and method. It will be apparent, however, to one skilled in the art that the present system and method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
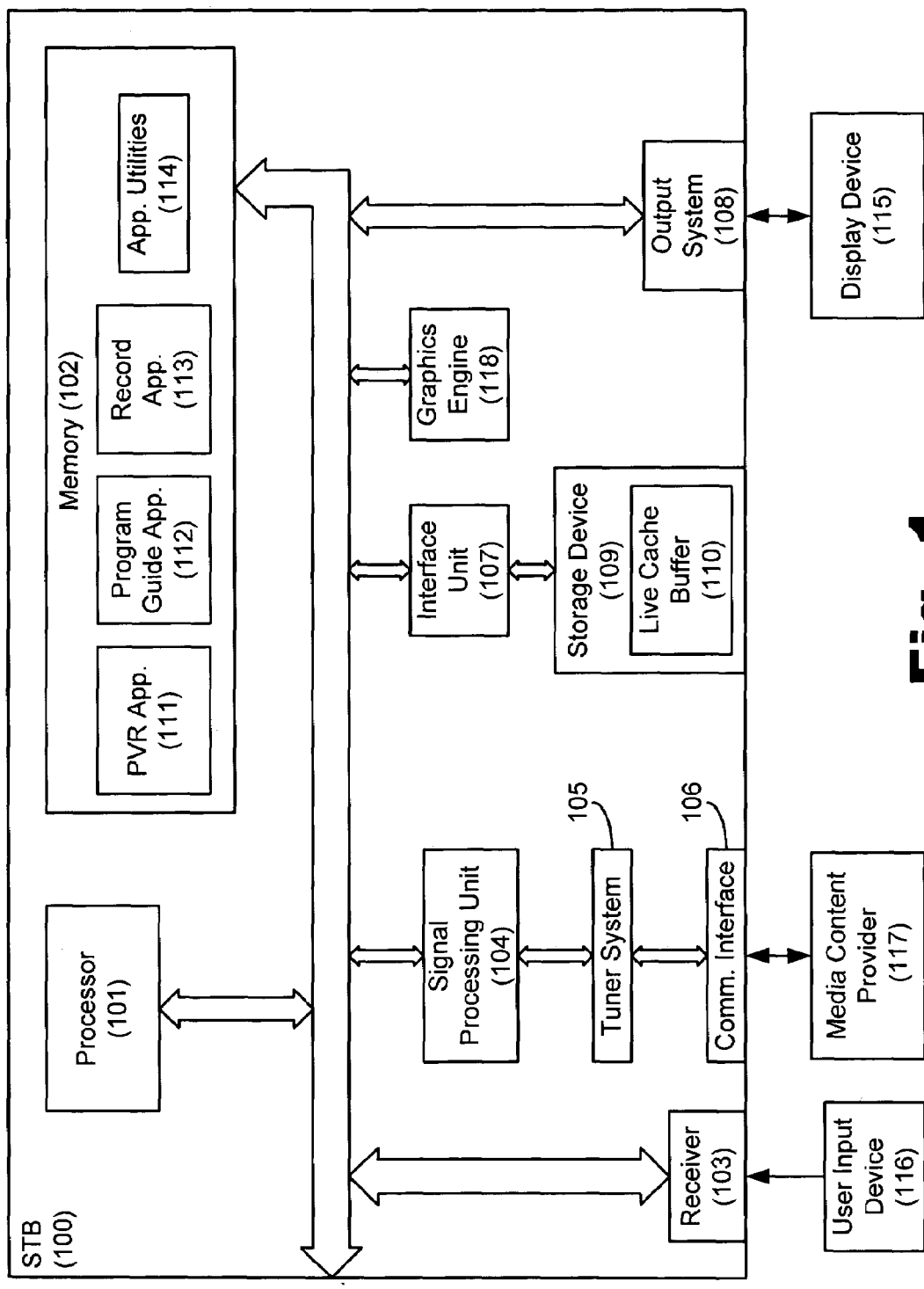
FIG. 1 is a block diagram of an exemplary set-top box according to one exemplary embodiment of the present invention.

FIG. 1 is a block diagram of an exemplary set-top box (STB) (100) according to an exemplary embodiment of the present invention. An STB (100) may also be referred to as a home communication terminal (HCT) or as a digital home communication terminal (DHCT). As used herein and in the appended claims, unless otherwise specifically denoted, the term "set-top box" will be used to refer expansively to all possible receivers that receive and decode digital and/or analog media content. It will be understood that the STB (100) shown in FIG. 1 is merely illustrative and should not be construed as implying any limitations upon the scope of the preferred embodiments of the invention.

As shown in FIG. 1, the STB (100) may include a communication interface (106) configured to receive media content from a media content provider (117). The media content provider (117) may provide various types of media content via a satellite or cable system (not shown). The media content may include, but is not limited to, television programs, pay-per-view services, video-on-demand programming, Internet services, and audio programming.

The STB (100) may also include a tuner system (105) configured to tune into a particular television channel or frequency to display media content and for sending and receiving various types of data or media content to and from the media content provider (117). According to an exemplary embodiment of the present invention, the tuner system (105) may include multiple tuners such that multiple channels of media content may be processed and/or shown on a display device (115). For example, the tuner system (105) may include a first tuner configured to receive an analog video signal corresponding to a first media content instance and a second tuner configured to simultaneously receive a digital compressed stream corresponding to a second media content instance. The tuner system (105) may have any number of tuners configured to receive any kind of media content according to one embodiment of the present invention.

The STB (100) may also include one or more processors, such as processor (101) configured to control operations of the STB (100), and an output system (108) configured to drive the display device (115). The display device (115) may be a television, computer monitor, or any other device configured to display or play the media content. The STB (100) may also include a signal processing unit (104) configured to process the media content. The signal processing unit (104) may include a demodulating and parsing system (not shown) for demodulating and parsing the media content. In one embodiment, the STB (100) may include multiple signal processing units (104) each corresponding to one of the tuners in the tuner system (105). The STB (100) may also include one or more compression and/or multiplexing units (not shown) for multiplexing various media content streams into a transport stream or the like.

One or more programmed applications (111-113) may be executed by a user of the STB (100) by utilizing the computing resources in the STB (100). The applications, or application clients, may be resident in memory (102). The memory (102) may be FLASH memory, DRAM memory, or a combination of FLASH and DRAM memory, for example. Applications (111-113) stored in memory (102) may be executed by the processor (101). Data generated by an application may be stored in the memory (102) or in a storage device (109) during the course of application execution. The memory (102) may also include application utilities (114) useful to the applications. The utilities (114) may include a timer manager, a configuration manager, a database manager, and other utilities depending on the particular applications included in the STB (100).

One of the applications may be a program guide application (112) configured to generate a single channel program guide that is displayed on the display device (115). An exemplary program guide is a graphical user interface (GUI) that performs various functions including allowing a user to select and view program information associated with various media content. Another one of the applications may be a record application (113). The record application (113) may be configured to permanently and/or temporarily record media content in one or more buffers.

The STB (100) may also include a personal video recording (PVR) application (111). According to an exemplary embodiment, the PVR application (111) may be integrated into the STB (100), as shown in FIG. 1, or it may be a stand-alone unit. A stand-alone PVR may be coupled to an STB (100) or it may be used in place of an STB (100). As used herein and in the appended claims, the term "PVR application" will be used to refer to any application or device configured to record media content and/or allow the viewing of media content in trick play mode. Trick play modes include, but are not limited to, slow motion, fast motion, reverse play, fast forward play, instant replay, jumping, pausing of live broadcast, and scanning. In the examples contained herein, it will be assumed that the PVR application (111) is integrated into the STB (100) for illustrative purposes only. In one embodiment, the program guide application (112) and/or the record application (113) may be integrated into the PVR application (111).

The PVR application (111) provides for media content recording functionality by enabling the temporary writing to, and if requested, more permanent recording to a storage device (109). The storage device (109) may be a hard drive, optical disc, or other non-volatile storage unit. The storage device (109) of FIG. 1 is shown to be a part of the STB (100) for illustrative purposes only. It will be understood that the storage device (109) may be an external storage device.

The STB (100) may also include a graphics engine (118) configured to generate graphics to be displayed on the display device (115). The graphics may include a progress bar, for example.

In one exemplary embodiment, media content received at the tuner (105) is temporarily buffered, or stored, in a live cache buffer (110). If there are multiple tuners (105), there may be a live cache buffer (110) corresponding to each of the tuners (105). As shown in FIG. 1, the live cache buffer (110) may be a part of the storage device (109) (e.g. a reserved portion of a hard dive). In an alternative embodiment (not shown), the live cache buffer (110) may reside in memory (102) or in a storage device external to the STB (100). Media content received into the live cache buffer (110) has a temporary recording designation. In other words, the media content stored in the live cache buffer (110) will either be deleted or retained through election by the user as a permanent recording. A permanent recording will be understood to mean media content that is stored for an extended period of time as decided by the user. Permanent recordings may be stored in a permanent buffer or in other non-buffer portions of the storage device (109). For illustrative purposes only, it will be assumed that permanent recordings are stored in permanent buffers in the examples given herein. The conversion of media content that is temporarily stored in the live cache buffer (110) to permanently recorded media content stored in a permanent buffer will be discussed below.

As will be understood by one skilled in the art, there is a time duration associated with the live cache buffer (110) corresponding to the quantity of data that the live cache buffer (110) is configured to store. This time duration will be referred to as a "live cache time window." The length or duration of the live cache time window may be specified by the user, according to one embodiment. For example, the user may specify a live cache time window of 30 minutes. In this example, the live cache buffer (110) will be configured to store a quantity of media content data representing 30 minutes. The length of the live cache time window as specified by the user may vary as best serves a particular application and may be limited by the size of the storage unit of which the live cache buffer (110) is a part and by the capabilities of the STB (100) and its components.

Figure 2:
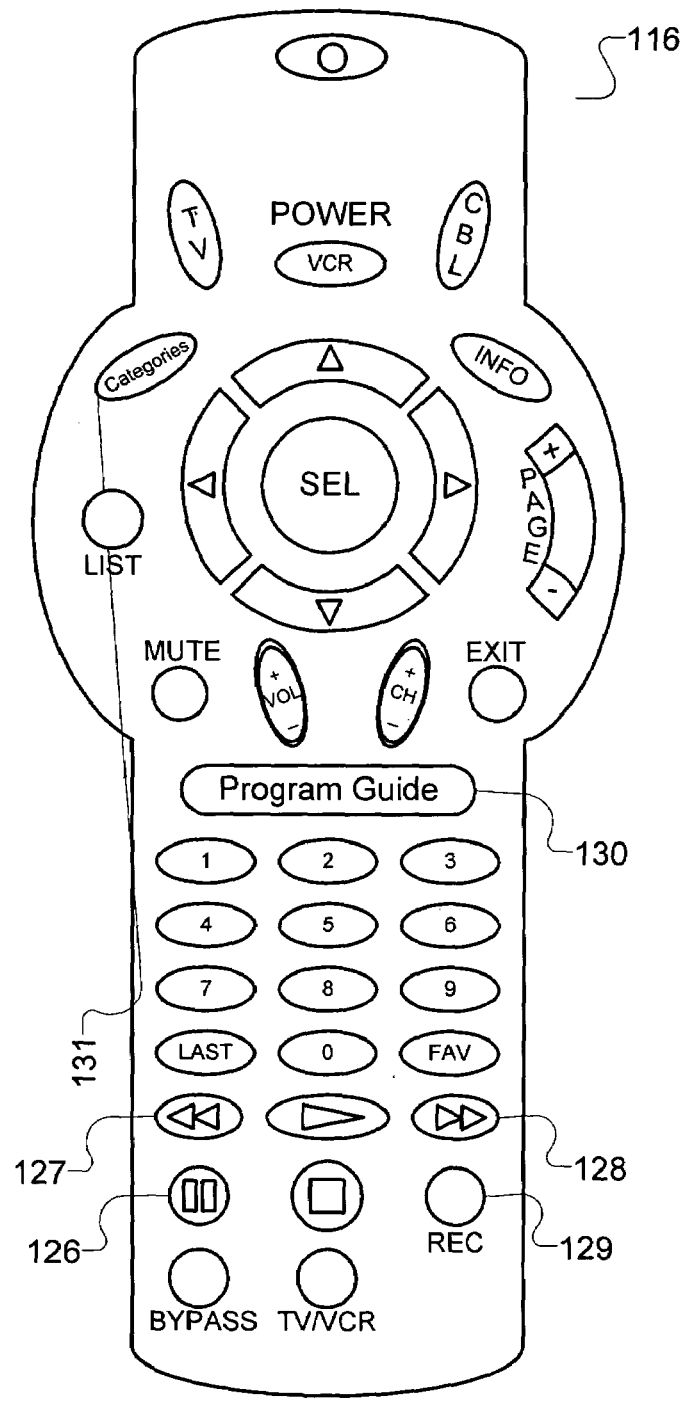
FIG. 2 is an exemplary user input device may be used in connection with the present invention according to one exemplary embodiment of the present invention.

An exemplary user input device (116) is shown in FIG. 2. The input device (116) may be a remote control, as shown in FIG. 2, or any other type of user input device such as a group of buttons (not shown) affixed to the STB (100), a touch screen input device (not shown) displayed on the display device (115), a keyboard device, or a voice activated device. The input device (116) may be configured to allow a user to control viewing options and trick play modes of the media content. For example, rewind (127) and fast-forward buttons (128) enable a user to quickly access different portions of the recorded media content. A record button (129) may also be included which enables the user to designate as permanently recorded any media content instance buffered in the live cache buffer (110). A pause button (126) may enable the user to pause the playback of recorded media content instance. A program guide button (130) may be configured to evoke the display of a program guide on the display device (115). Many alternative methods of providing user input may be used including a remote control device with distinct buttons and/or button layouts. The embodiments of the invention described herein are not limited by the type of device used to provide user input.

Figure 3:
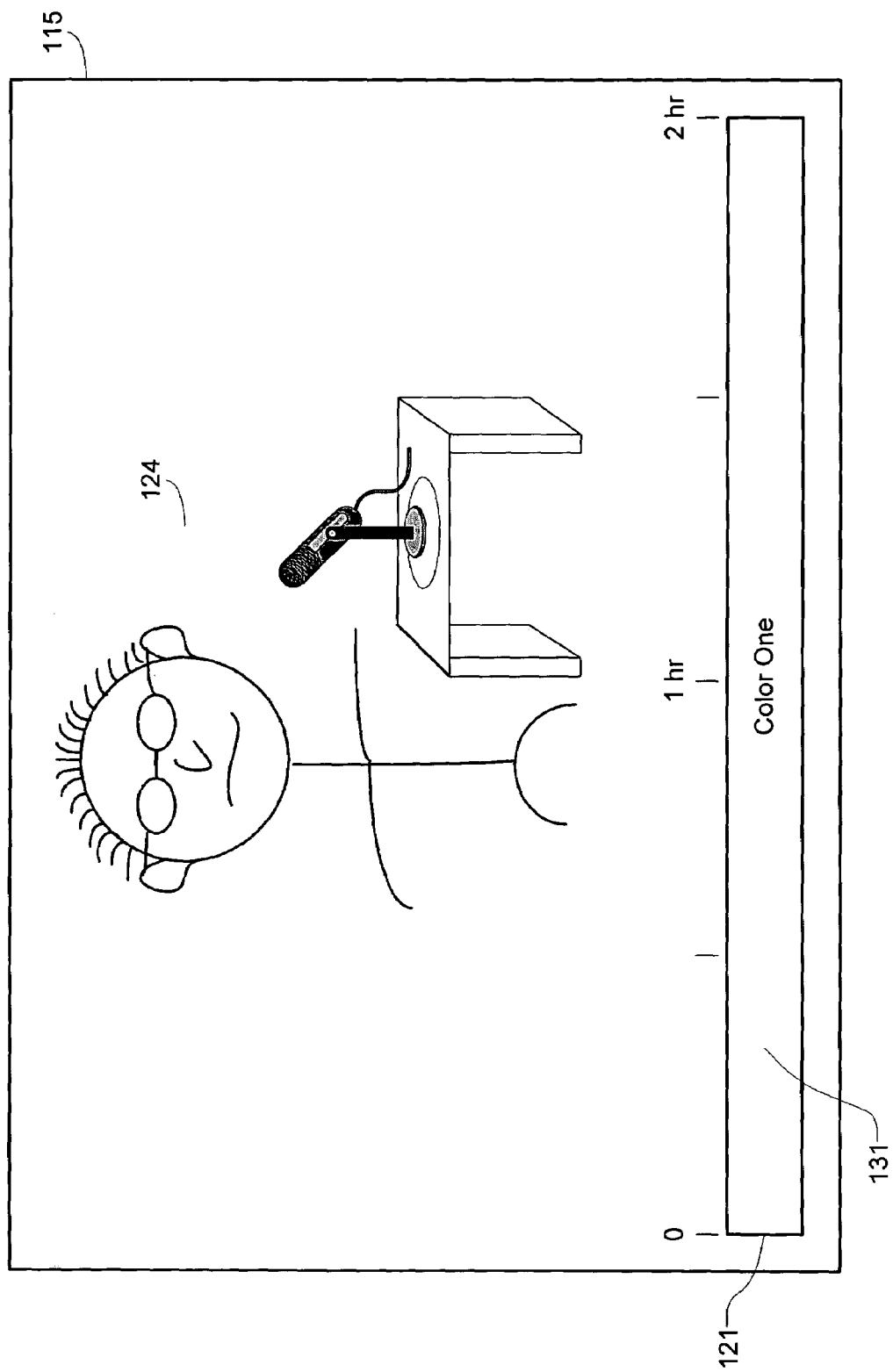
FIG. 3 illustrates a progress bar including a first portion having a first color displayed on a display device according to one exemplary embodiment of the present invention.

FIG. 3 illustrates an exemplary embodiment of the present invention wherein a multi-colored progress bar (121) is displayed on the display device (115). The display device (115) in FIG. 3 is a television for illustrative purposes. The progress bar (121) is a graphical user interface (GUI) that assists the user in navigating to, and between, media content that is stored in a buffer. In one embodiment, the progress bar (121) may be used in connection with media content that is temporarily stored in a live cache buffer (110) or permanently stored in a permanent buffer. Any reference to recorded or stored media content in the following examples and in the appended claims, unless specifically denoted otherwise, refers to media content that is either temporarily stored in a live cache buffer (110) or permanently stored in a permanent buffer.

As shown in FIG. 3, the progress bar (121) may be superimposed on top of the viewing portion of the display device (115) such that the viewer may simultaneously view a media content instance (124) and the progress bar (121). The progress bar (121) is preferably located in the bottom half of the viewing portion of the display device (115), as shown in FIG. 3, so as not to overly interfere with the current media content instance (124). However, in an alternative embodiment, the progress bar (121) may be located at any position on the viewing portion of the display device (115). Furthermore, the exact location of the progress bar (121) may be specified by the user.

In one embodiment, a time scale may also be displayed on the display device (115) to indicate the duration of the recorded media content. For example, in FIG. 3, the time scale goes from zero to two hours to indicate that there are two hours of recorded media content. The time scale and number of segments included in the time scale may vary as best serves a particular application and may be specified by the user.

In one embodiment, the progress bar (121) graphically illustrates to a user the amount of recorded media content that has been stored in a live cache buffer (110) or in a permanent buffer. The progress bar (121) may also graphically show progression, in terms of buffer space, through recorded media content stored in the live cache buffer (110) or in the permanent buffer as the viewer moves, or navigates, through the media content. The progress bar may also illustrate a number of other informational facts about the media content as will be described below.

According to one embodiment of the present invention, the progress bar (121) may include a number of distinctly colored portions. Each of the distinctly colored portions of the progress bar (121) may represent different information corresponding to the recorded media content. For example, in one embodiment, as shown in FIG. 3, the progress bar (121) may include a first portion (131) having a first color (color one). The first portion (131) graphically represents the entire duration of the recorded media content. In one embodiment, the length of the first portion (131) of the progress bar (121) increases as live media content is being recorded to visually indicate to the user the amount of media content that has been recorded in either the live cache buffer (110) or in a permanent buffer. Once all the media content has been recorded, the length of the first portion (131) of the progress bar (121) becomes fixed. For example, the first portion (131) of the progress bar (121) in FIG. 3 has a length that corresponds to two hours. Hence, there are two hours of recorded media content in the live cache buffer (110) or in some other permanent buffer.

Figure 4:
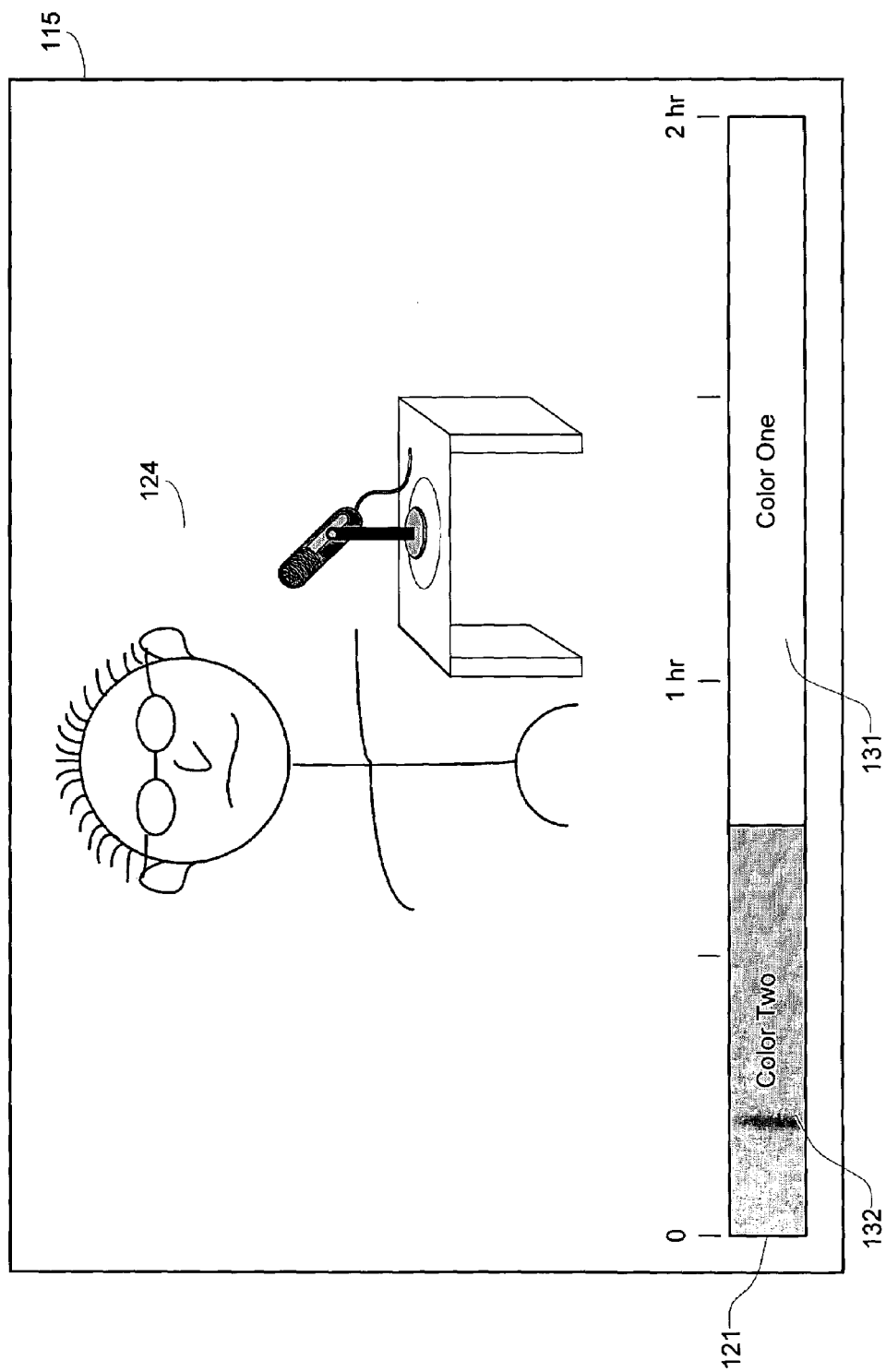
FIG. 4 illustrates that the progress bar may include a second portion having a second color according to one exemplary embodiment of the present invention.

FIG. 4 illustrates another embodiment wherein the progress bar (121) includes a second portion (132) having a second color (color two). Color two and color one are distinct colors and/or have distinct graphical patterns so that the user may easily distinguish between the two colors. The second portion (132) of the progress bar (121) represents the duration of a portion or section of the recorded media content that has been viewed or replayed by the user during a particular viewing session of the recorded media content. A viewing session is initiated by either a channel change or a playback start of already recorded media content. In one embodiment, the second portion (132) of the progress bar (121) maybe superimposed on top of the first portion (131) of the progress bar (121). In one embodiment, the second portion (132) of the progress bar (121) has priority over the first portion (131). As used herein and in the appended claims, priority refers to which color dominates when a particular portion of the progress bar (121) is superimposed on top of another portion of the progress bar (121). For example, because the second portion (132) of the progress bar (121) has priority over the first portion (131), the area of the progress bar (121) having portion two (132) superimposed on top of portion one (131) is colored with the second color (color two).

The second portion (132) of the progress bar (121) in FIG. 4 shows that the user began viewing the recorded media content at time zero and that approximately 45 minutes of the recorded media content has been displayed on the display device (115) during the particular viewing session. As the user views the recorded media content, the length of the second portion (132) of the progress bar (121) increases until the second portion (132) completely covers the first portion (131) of the progress bar (121), indicating that the user has viewed the entire duration of the recorded media content during the viewing session.

Figure 5:
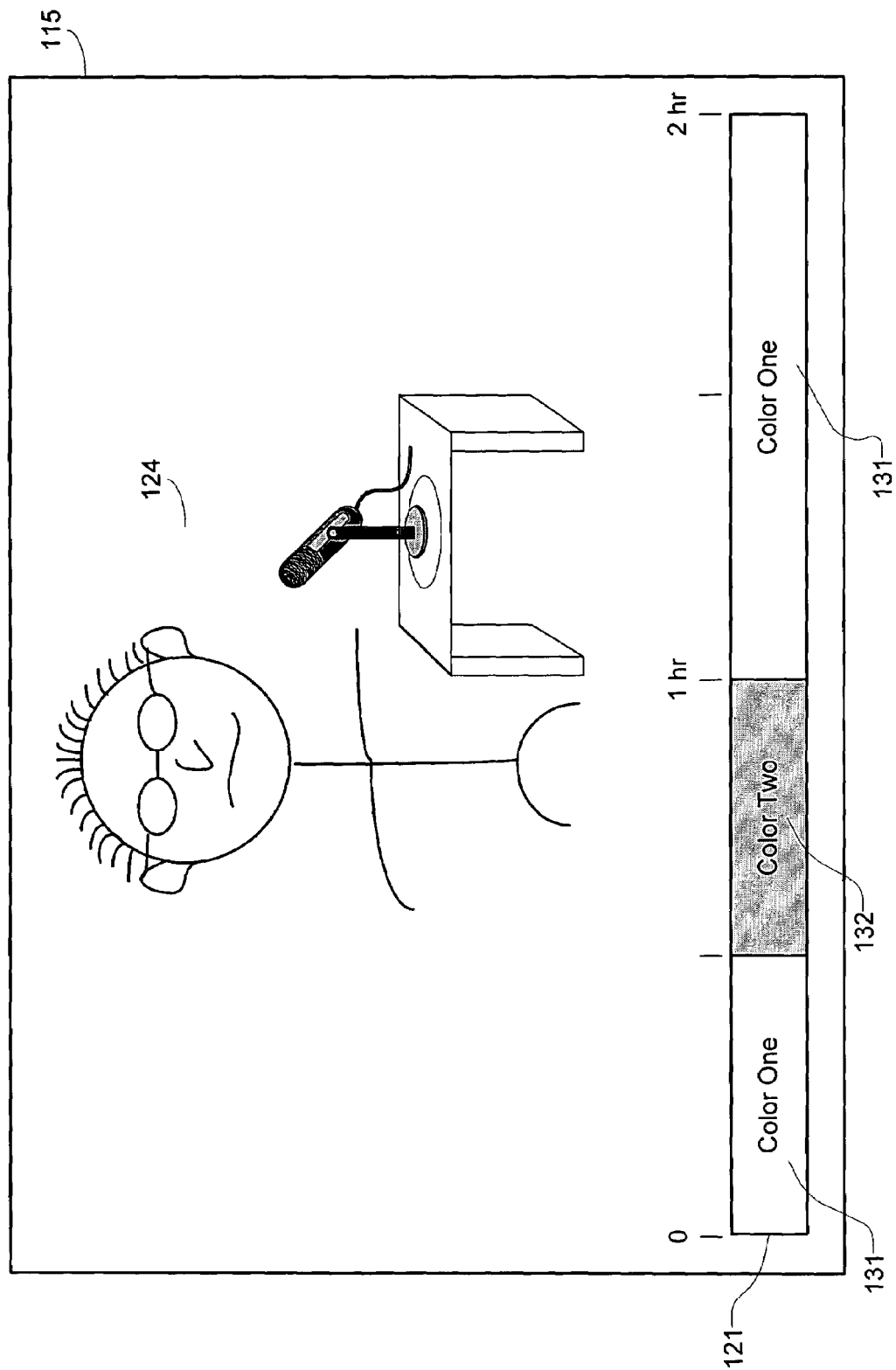
FIG. 5 illustrates an exemplary situation wherein the user begins viewing the recorded media content at an entry point approximately equal to thirty minutes after time zero according to one exemplary embodiment of the present invention.

The user may also begin viewing the recorded media content at an entry point somewhere in between the beginning time (time zero) and the ending time of the recorded media content. FIG. 5 illustrates an exemplary situation wherein the user begins viewing the recorded media content at an entry point approximately equal to thirty minutes after time zero. Thus, the second portion (132) of the progress bar (121) of FIG. 5 begins at approximately thirty minutes after time zero. The second portion (132) of the progress bar (121) covers an area approximately equal to thirty minutes and shows that the user has viewed the recorded media content between the 30 minute mark and the one hour mark.

Figure 6:
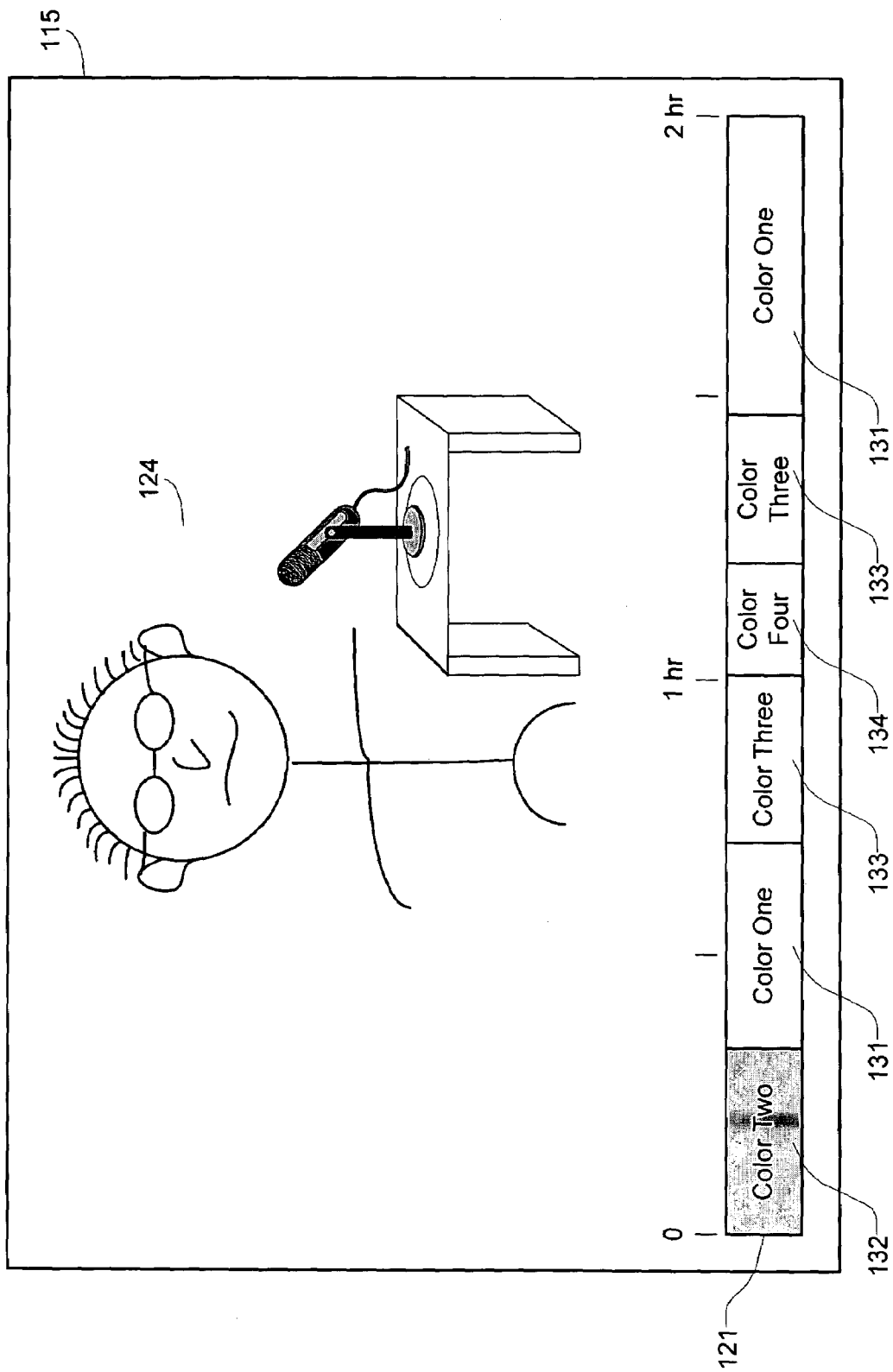
FIG. 6 illustrates a progress bar having portions corresponding to sections of the recorded media content that have been edited by the user according to one exemplary embodiment of the present invention.

FIG. 6 illustrates an additional embodiment wherein portions of the progress bar (121) corresponding to sections of the recorded media content that have been edited by the user have distinct colors to visually indicate to the user that the media content has been edited. For example, FIG. 6 shows that a third portion (133) of the progress bar (121) having a third color (color three) may represent a portion or section of the recorded media content that has been designated by the user for editing. For example, the third portion (133) may represent a cut and paste region of the recorded media content as selected by the user. A fourth portion (134) of the progress bar (121) having a fourth color (color four) may represent deleted sections of the recorded media content. Hence, as shown in FIG. 6, the fourth portion (134) of the progress bar (121) is superimposed on top of the third portion (133) of the progress bar (121) to show that the deleted section of the recorded media content is within the portion of the media content selected for editing. In one embodiment, the fourth portion (134) has priority over the third portion (133) and the third portion (133) has priority over the second portion (132).

During any particular viewing session, the user may view the recorded media content using trick modes. In one embodiment, the second portion (132) of the progress bar (121) graphically tracks the user's navigation through the recorded media content being viewed in a trick mode. For example, if the user fast forwards from any one point in the recorded media content, the length of the second portion (132) of the progress bar (121) grows at an accelerated rate. Likewise, if the user rewinds from any one point in the recorded media content, the length of the second portion (132) of the progress bar (121) shall shrink at an accelerated rate.

If, as in the example of FIG. 5, the user has begun viewing the recorded media content at an entry point equal to any time other than time zero, and the user rewinds past this entry point, the start time of the second portion (132) of the progress bar (121) is moved to the left to reflect the new rewind position. In this case, the second portion (132) of the progress bar may have no horizontal dimension and may appear to be a small vertical bar until the user causes the recorded media content to fast forward and/or play for a period of time.

Figure 7:
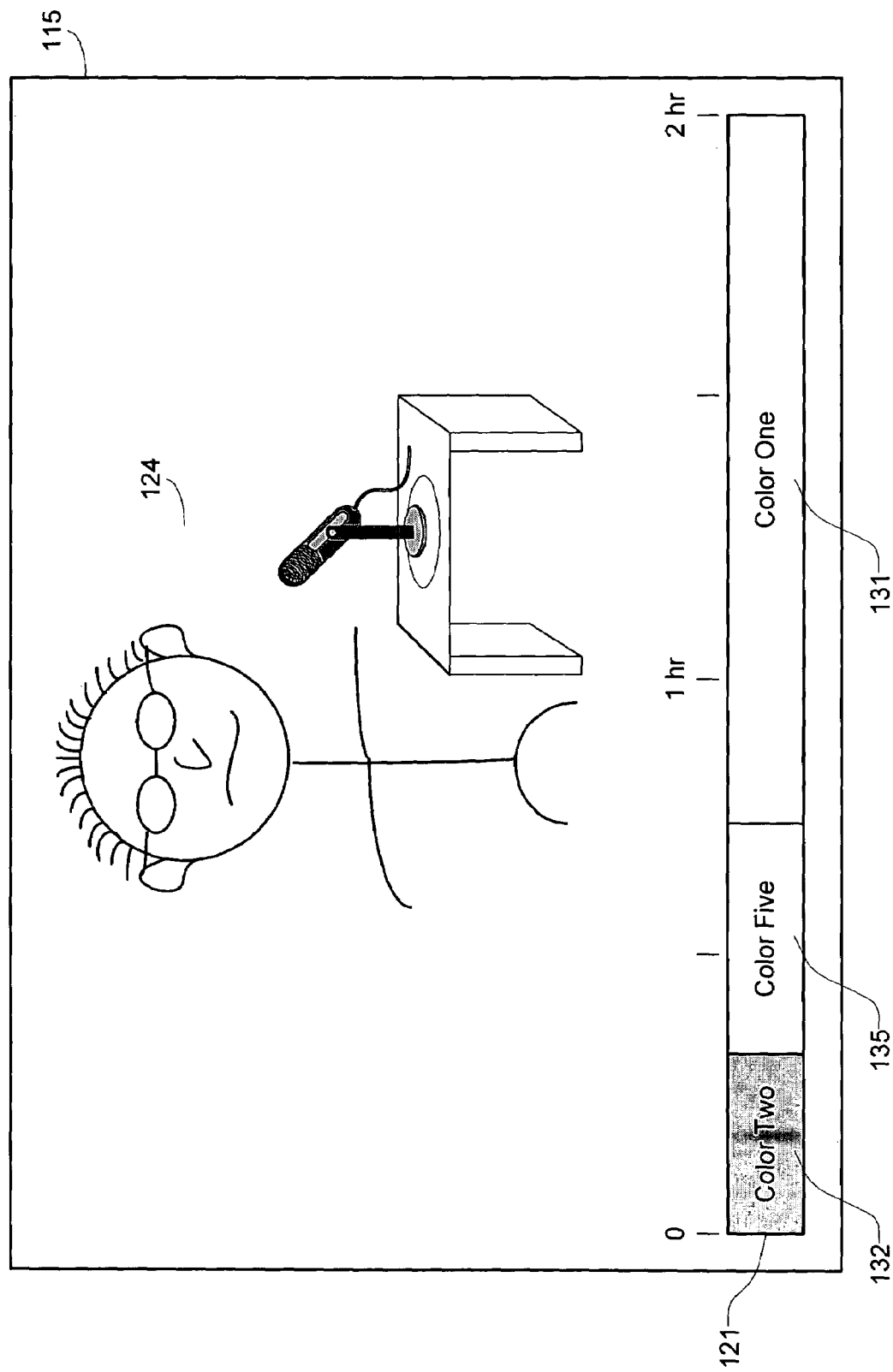
FIG. 7 illustrates that a fifth portion of the progress bar having a fifth color may be used when the user is viewing the recorded media content in trick mode according to one exemplary embodiment of the present invention.

FIG. 7 illustrates that a fifth portion (135) of the progress bar (121) having a fifth color (color five) may be used when the user is viewing the recorded media content in trick mode. The fifth portion (135) may represent the entire portion or section of the recorded media content that the viewer has viewed. Thus, the fifth portion (135) mirrors the second portion (132) until a trick mode is initiated. Once the trick mode has been initiated, as explained above, the second portion (132) may shrink as it tracks the user's navigation through the recorded media content. In this instance, the fifth portion (135) becomes visible to show the user the entire amount of recorded media content that has been viewed by the user. For example, FIG. 7 shows that the recorded media content in FIG. 3 has been rewound to approximately the 15 minute mark after 45 minutes of recorded media content have been viewed. The second portion (132) therefore shrinks to track this rewinding and covers the area between time zero and the 15 minute mark. The fifth portion (135) covers the area between the 15 minute mark and the 45 minute mark to indicate to the user that 45 minutes of recorded media content have been viewed. In one embodiment, the second portion (132) has priority over the fifth portion (135) and the fifth portion (135) has priority over the first portion (131).

Figure 8:
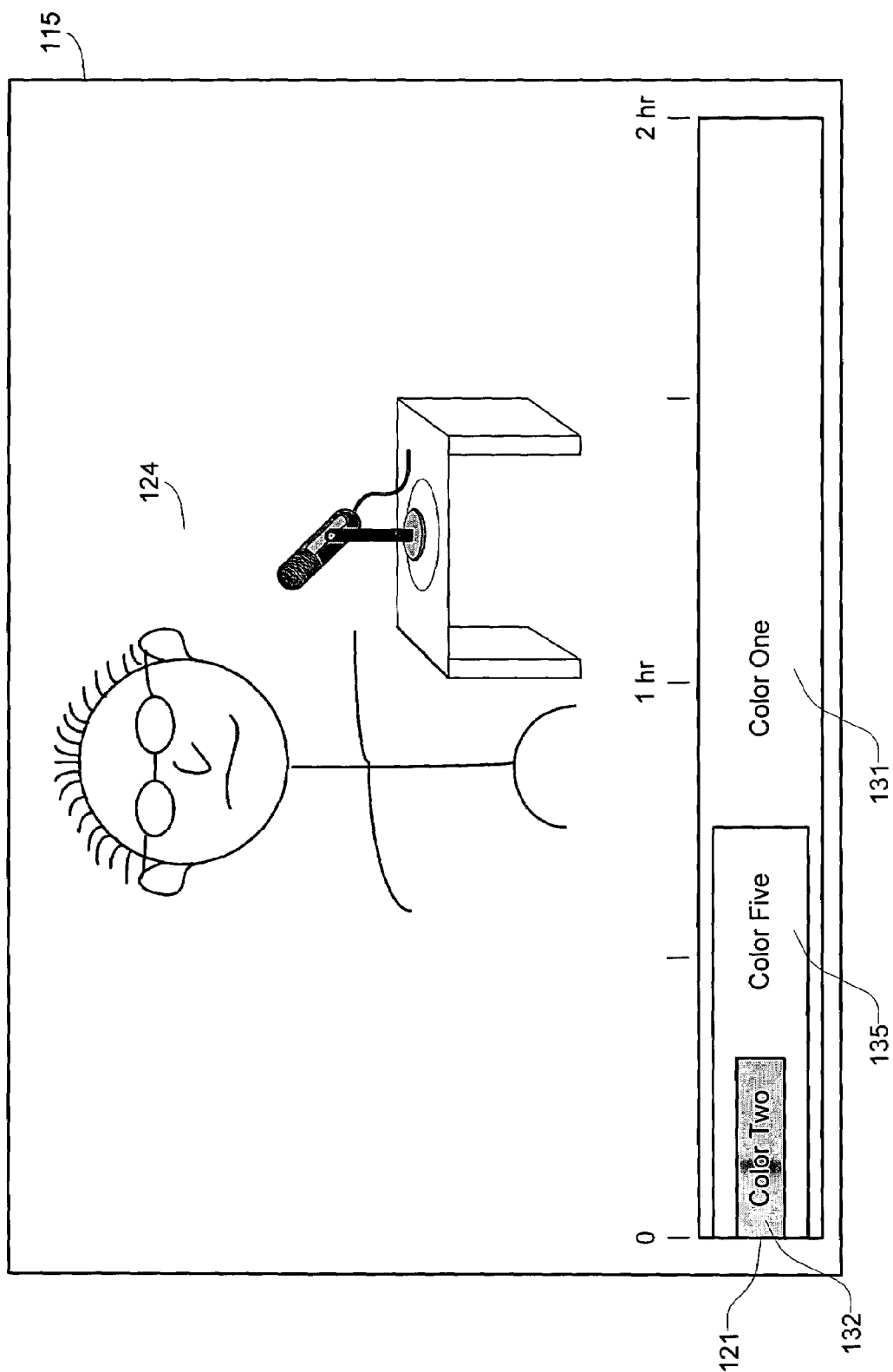
FIG. 8 illustrates a progress bar wherein the various portions of the progress bar are of different vertical dimensions to help illustrate true durations of each of the portions according to one exemplary embodiment of the present invention.
Figure 9:
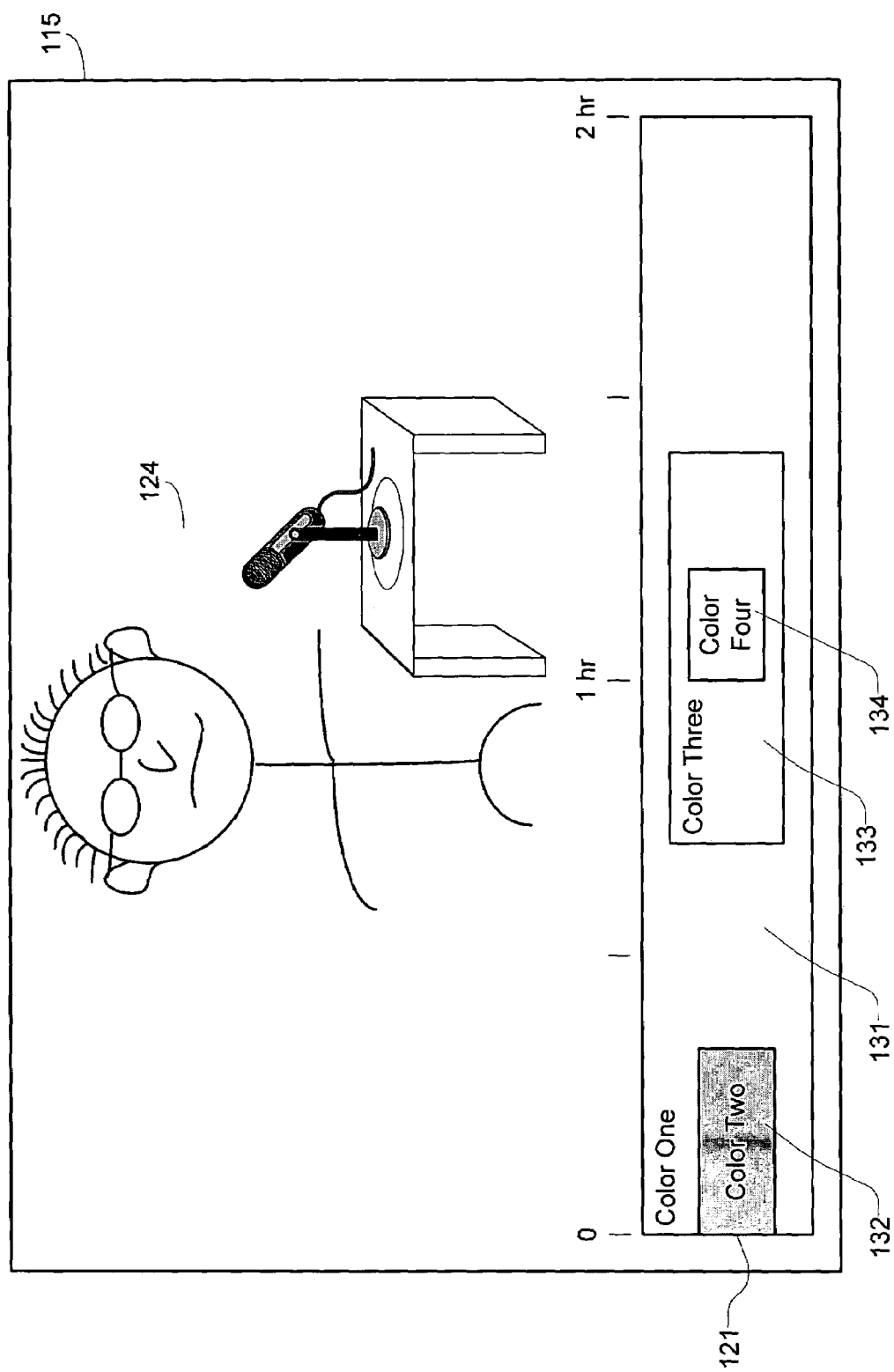
FIG. 9 also illustrates a progress bar wherein the various portions of the progress bar are of different vertical dimensions to help illustrate true durations of each of the portions according to one exemplary embodiment of the present invention.

FIGS. 8 and 9 illustrate an alternative embodiment wherein the various portions of the progress bar (121) are of different vertical dimensions to help illustrate true durations of each of the portions. For example, FIG. 8 is an alternative method of displaying the portions of the progress bar (121) shown in FIG. 7. FIG. 8 shows that the fifth portion (135) is narrower in the vertical direction than the first portion (131) such that the first portion (131) surrounds the fifth portion (135). Likewise, the second portion (132) is narrower in the vertical direction than the fifth portion (135) such that the fifth portion (135) surrounds the second portion (132). FIG. 9 likewise illustrates an alternative method of displaying the portions of the progress bar (121) shown in FIG. 6 wherein the various portions have different vertical dimensions to help illustrate true dimension of each of the portions.

Figure 10:
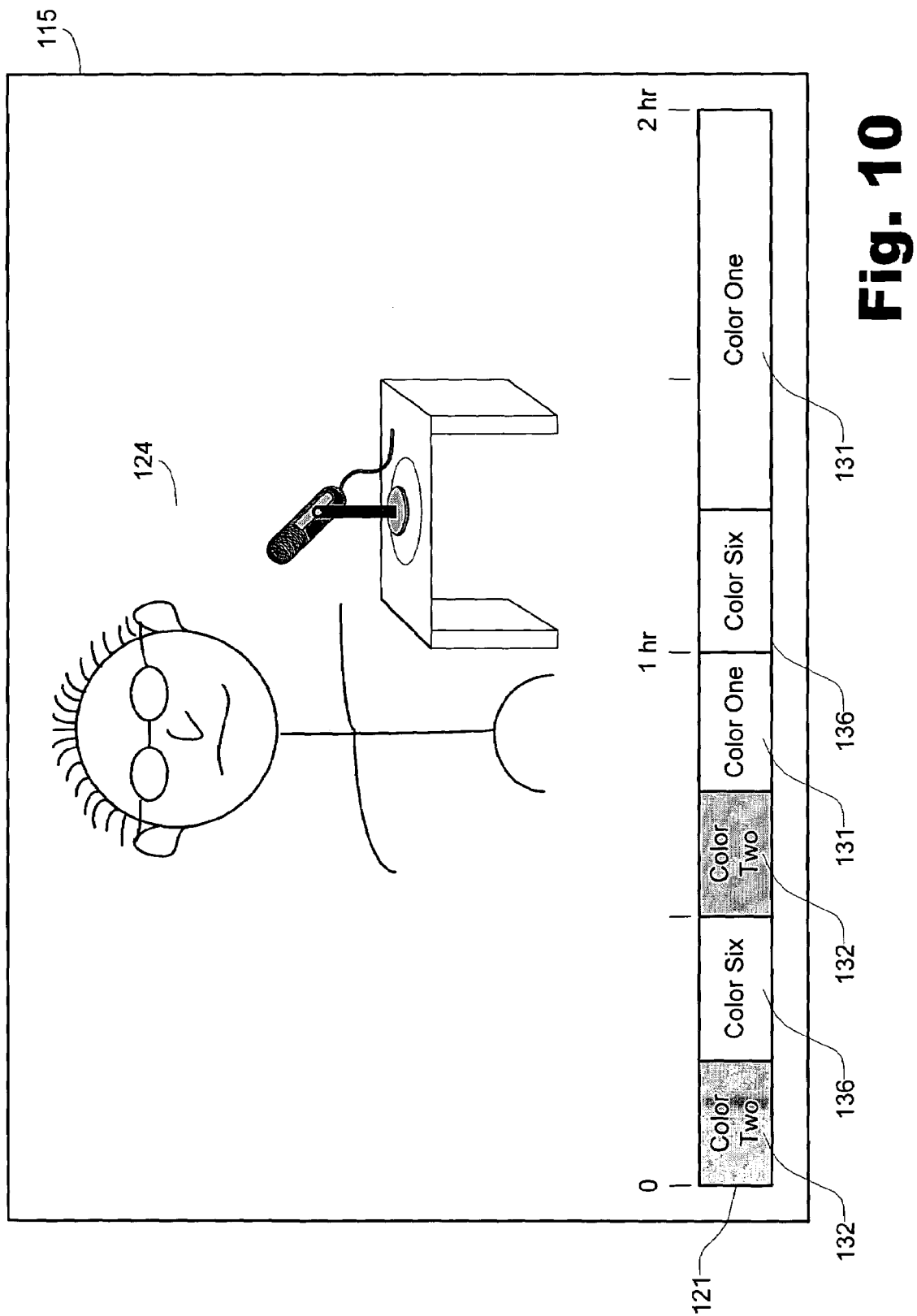
FIG. 10 illustrates a progress bar that includes a sixth portion having a sixth color that is configured to represent time periods within the recorded media content wherein a signal drop-out prevented the recording of the media content according to one exemplary embodiment of the present invention.

FIG. 10 illustrates another embodiment of the present invention where a sixth portion (136) of the progress bar (121) having a sixth color (color six) may be configured to represent time periods within the beginning and end times of the recorded media content wherein a signal drop-out prevents the recording of the media content. For example, as shown in FIG. 10, a signal drop-out or some other event may prevent the recording of the media content between the 15 and 30 minute markers as well as between the 60 and 75 minute markers. Instead of eliminating these time periods from the progress bar (121) and shrinking the length of the overall progress bar (121) by a total time of 30 minutes, the sixth portion (136) may be rendered between the 15 and 30 minute markers and between the 60 and 75 minute markers.

In one embodiment, the sixth portion (136) has priority over all other portions of the progress bar (121). Thus, as the user views the recorded media content from time zero, as shown in FIG. 10, the second portion (132) skips over the sixth portion (136) between the 15 and 30 minute markers and continues to grow as the recorded media content is viewed.

Although six different possible portions of the progress bar (121) have been described in the preceding examples, it will be recognized that these six portions are merely illustrative of the numerous types of information that may be conveyed about recorded media content using distinctly colored portions. Additional portions may also be included in the progress bar (121) such as portions representing the user's favorite portion or section of the recorded media content, different media content instances within the recorded media content, etc.

Figure 11:
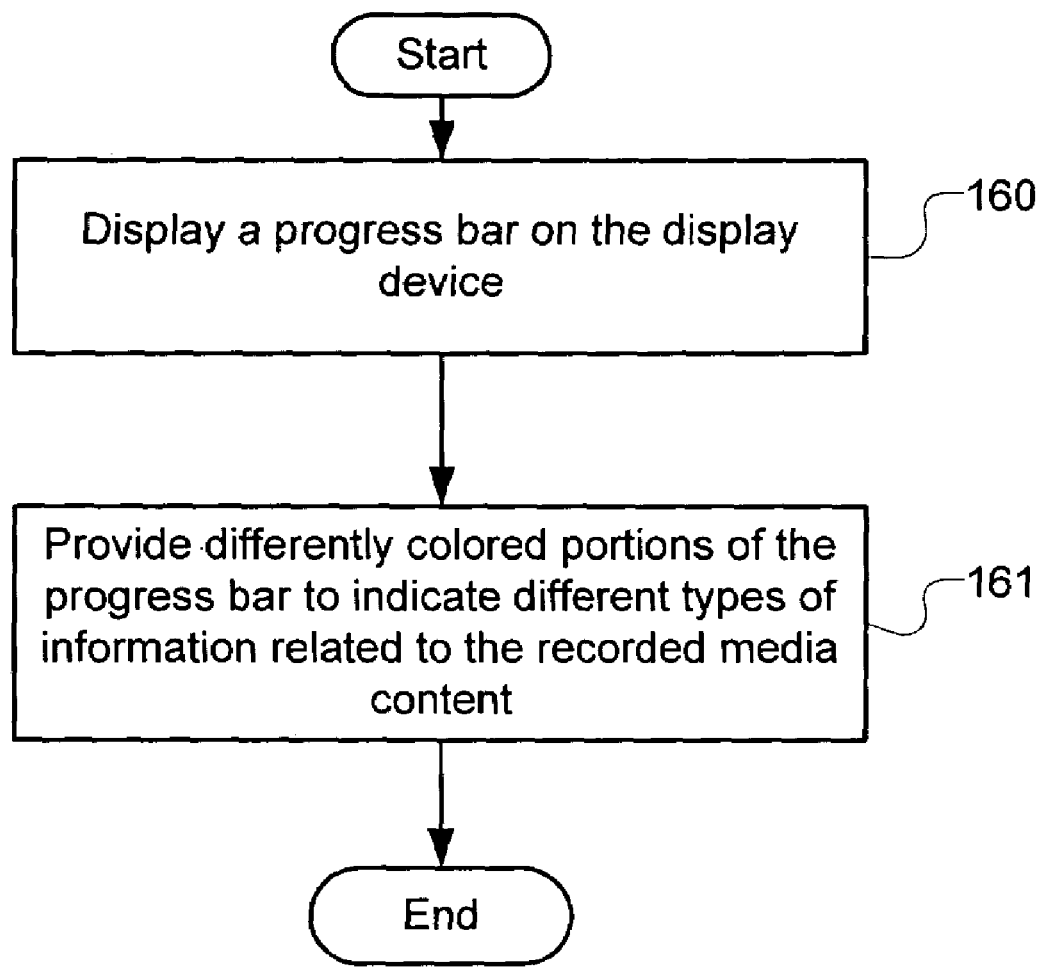
FIG. 11 is a flow chart illustrating an exemplary method of displaying a multi-colored progress bar according to one exemplary embodiment of the present invention.

FIG. 11 is a flow chart illustrating an exemplary method of displaying a multi-colored progress bar (121). A progress bar is first displayed on the display device (step 160). The progress bar may be rendered by the graphics engine (118; FIG. 1), for example. The graphics engine (118) is configured to render distinct colors. The progress bar is divided into distinctly colored portions to indicate different types of information related to the recorded media content (step 161). The size of these distinctly colored portions may vary according to the particular navigation through the recorded media content as determined by the user. The PVR application (111; FIG. 1), the processor (101; FIG. 1) and/or additional applications or components of the STB (100; FIG. 1) may be configured to determine the size, color, and position of the various portions of the progress bar (121). Furthermore, the PVR application (111; FIG. 1), the processor (101; FIG. 1) and/or additional applications or components of the STB (100; FIG. 1) may be further configured to store user statistics during a particular viewing session. These user statistics may include, but are not limited to, the duration of the recorded media content, the entry points into the recorded media content, and the duration of the viewed media content. Using these user statistics, the various portions of the progress bar (121) may be properly rendered.

Furthermore, the PVR application (111; FIG. 1), the processor (101; FIG. 1) and/or additional applications or components of the STB (100; FIG. 1) may be configured to determine the time periods corresponding to unrecorded media content due to signal drop-out. In one embodiment, a start code table may be used to track the position of frames in a digitally encoded stream of media content data. Associated with each frame is a time stamp. These time stamps become discontinuous during a signal drop-out. The duration of the discontinuity may be determined by analyzing the start code table stream. If a discontinuity is detected, the duration and position of the discontinuity may be recorded in a separate discontinuity table. The discontinuity table may be read to construct a linked-list of signal drop-out duration gaps. Each entry in the linked-list may contain the start time of the signal drop-out and the duration in seconds of the signal drop-out. Using this information, the sixth section (136) corresponding to the portions of the media content that are not recorded due to signal drop-out may be properly rendered on the display device.

Figure 12:
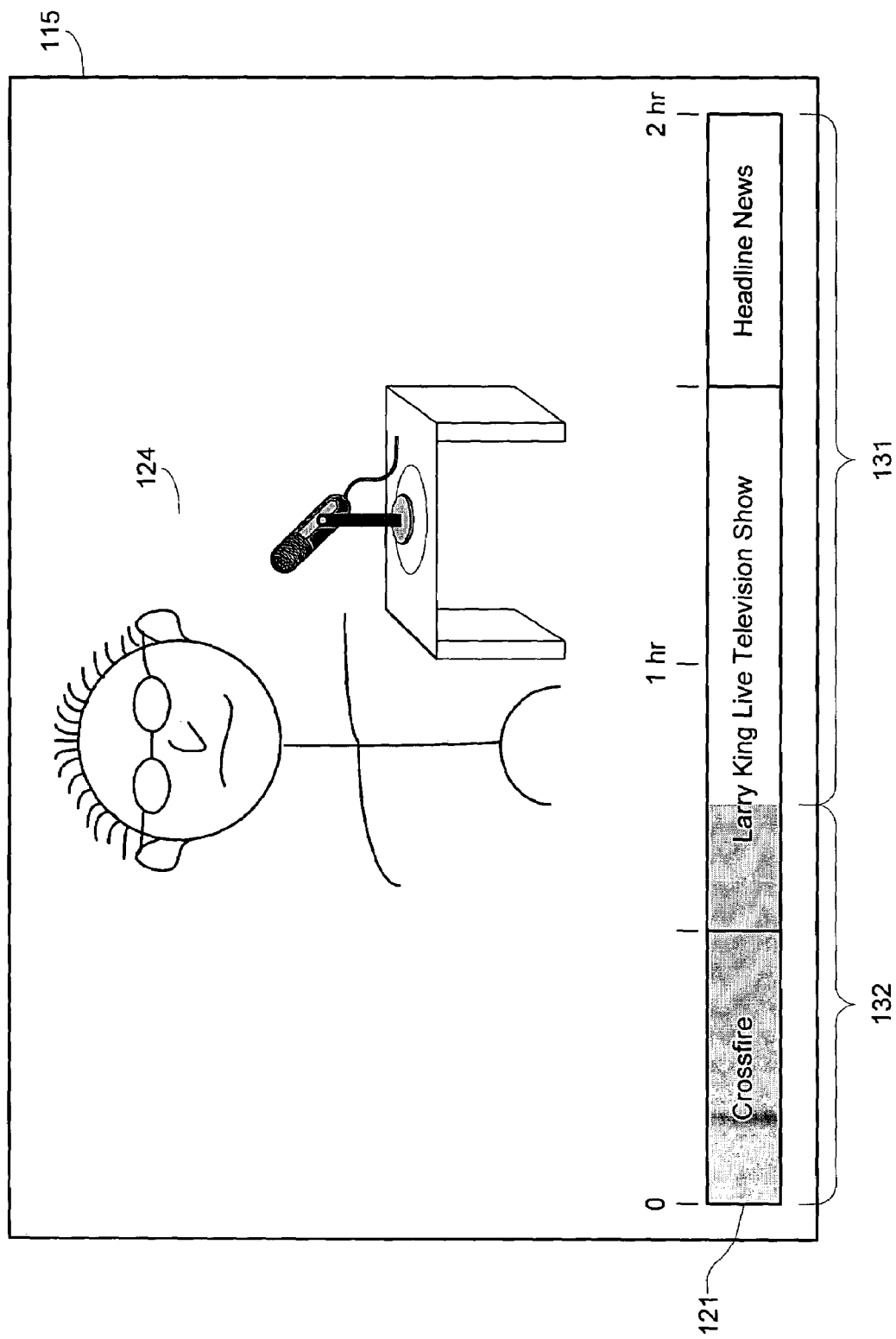
FIG. 12 illustrates a progress bar that includes a number of blocks of program information corresponding to the recorded media content according to one exemplary embodiment of the present invention.

FIG. 12 illustrates that the progress bar (121) may include a number of blocks of program information corresponding to the recorded media content. For example, the recorded media content may include three different media content instances-the television programs Crossfire, Larry King Live Television Show, and Headline News. As shown in FIG. 12, the program information shown may include the title of the three media content instances. Additional program information may also be shown. Program information may include, but is not limited to, genre information, ratings information, program start and stop times, program descriptions, and other pertinent program information text. In one embodiment, the program information text is always viewable to the user while the progress bar (121) is being displayed. The progress bar (121) may also be superimposed on top of a single or multi-channel program guide that displays program information similar to that of FIG. 12.

In one embodiment, each portion of the progress bar (121) has a distinct color such that each portion is easily distinguishable by the user. The particular color corresponding to each of the portions may vary as best serves a particular application. The distinct colors may differ merely in shading and/or patterning according to one embodiment of the present invention. Furthermore, in the preceding examples corresponding to FIGS. 3-9, vertical bars are shown in the figures to illustrate the separation of the different portions of the progress bar (121). It is important to note that these vertical bars are for illustrative purposes only and that they may or may not be included in actual implementation of the present invention as described herein.

In one embodiment of the present invention, the display of the progress bar (121) and/or any of the portions of the progress bar (121) may be initiated by the user or automatically by an application within the STB (100; FIG. 1).

The PVR, program guide, and record applications (111-113) may be implemented in hardware, software, firmware, or a combination thereof. For example, the applications (111-113) may be implemented in software or firmware that is stored in a memory and that is executed by a suitable instruction execution system. If implemented in hardware, as in an alternative embodiment, the PVR, program guide, and record applications (111-113) may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The PVR, program guide, and record applications (111-113) may comprise an ordered listing of executable instructions for implementing logical functions and may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. A "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of providing information about recorded media content having a beginning and end time, said method comprising:
    displaying a progress bar having a first portion, said first portion graphically representing the duration of said recorded media content and having a first color; and
    displaying a second portion having a second color in said progress bar, said second portion graphically representing a section of said recorded media content that is viewed during a viewing session;
    wherein said second color is distinct from said first color; and
    wherein said second portion graphically tracks a navigation through said recorded media content being viewed in a trick mode.

2. The method of claim 1, further comprising:
    displaying a third portion having a third color in said progress bar, said third portion graphically representing a section of said recorded media content that is designated for editing;
    wherein said third color is distinct than said first and second colors.

3. The method of claim 2, further comprising:
    displaying a fourth portion having a fourth color in said progress bar, said fourth portion graphically representing a deleted section of said recorded media content;
    wherein said fourth color is distinct from said first, second, and third colors.

4. The method of claim 1, wherein the length of said second portion shrinks when said recorded media content is rewound.

5. The method of claim 1, wherein the length of said second portion increases when said recorded media content is fast forwarded.

6. The method of claim 1, further comprising:
    displaying a sixth portion having a sixth color in said progress bar, said sixth portion graphically representing unrecorded media content;
    wherein said sixth color is distinct from said first and second colors.

7. The method of claim 6, wherein said unrecorded media content is caused by a signs drop-out.

8. The method of claim 6, wherein said unrecorded media content corresponds to one or more time periods within said beginning and end times of said recorded media content.

9. The method of claim 1, wherein said section of said recorded media content that is viewed during said viewing session starts at said beginning time of said recorded media content.

10. The method of claim 1, wherein said section of said recorded media content that is viewed during a viewing session starts at an entry point that is sequentially after said beginning time of said recorded media content.

11. The method of claim 1, wherein said recorded media content is stored in a live cache buffer.

12. The method of claim 1, wherein said recorded media content is stored in a permanent buffer.

13. The method of claim 12, further comprising:
    displaying a fifth portion having a fifth color in said progress bar, said fifth portion graphically representing an entire section of said recorded media content that is viewed;
    wherein said fifth color is distinct from said first and second colors.

14. The method of claim 1, further comprising displaying a time scale.

15. The method of claim 1, further comprising displaying program information corresponding to said recorded media content.

16. The method of claim 15, wherein said step of displaying said program information comprises superimposing said program information on top of said progress bar.

17. The method of claim 1, wherein said second portion has a smaller vertical dimension than does said first portion.

18. The method of claim 1, further comprising:
    displaying one or more additional portions in said progress bar;
    wherein each of said one or more additional portions has a distinct color from said first and second colors, wherein each of said one or more additional portions provides additional information about said recorded media content.

19. A system for providing information about recorded media content having a beginning and end time, said system comprising:
    a memory unit including a number of applications;
    a storage device including a buffer for storing said recorded media content;
    a graphics engine configured to render graphics that are displayed on a display device; and
    a processor configured to use one or more of said number of applications to cause said graphics engine to display a progress bar on said display device;
    wherein said progress bar comprises a first portion and a second portion, said first portion graphically representing the duration of said recorded media content and having a first color, said second portion having a second color and graphically representing a section of said recorded media content that is viewed during a viewing session.

20. The system of claim 19, wherein said second color is distinct from said first color.

21. The system of claim 19, wherein said progress bar further comprises a third portion having a third color, said third portion graphically representing a section of said recorded media content that is designated for editing, wherein said third color is distinct from said first and second colors.

22. The system of claim 21, wherein said progress bar further comprises a fourth portion having a fourth color, said fourth portion graphically representing a deleted section of said recorded media content, wherein said fourth color is distinct from said first, second, and third colors.

23. The system of claim 19, wherein said second portion graphically tracks a navigation through said recorded media content being viewed in a trick mode.

24. The system of claim 23, wherein the length of said second portion shrinks when said recorded media content is rewound.

25. The system of claim 23, wherein the length of said second portion increases when said recorded media content is fast forwarded.

26. The system of claim 23, wherein said progress bar further comprises a fifth portion having a fifth color, said fifth portion graphically representing an entire section of said recorded media content that is viewed, wherein said fifth color is distinct from said first and second colors.

27. The system of claim 19, wherein said progress bar further comprises a sixth portion having a sixth color, said sixth portion graphically representing unrecorded media content, wherein said sixth color is distinct from said first and second colors.

28. The system of claim 27, wherein said unrecorded media content is caused by a signal drop-out.

29. The system of claim 27, wherein said unrecorded media content corresponds to one or more time periods within said beginning and end times of said recorded media content.

30. The system of claim 19, wherein said section of said recorded media content that is viewed during said viewing session starts at said beginning time of said recorded media content.

31. The system of claim 19, wherein said section of said recorded media content that is viewed during a viewing session starts at an entry point that is sequentially after said beginning time of said recorded media content.

32. The system of claim 19, wherein said buffer is a live cache buffer or a permanent buffer.

33. The system of claim 19, wherein said processor causes said graphics engine to further display a time scale on said display device.

34. The system of claim 19, wherein said processor causes said graphics engine to further display program information corresponding to said recorded media content.

35. The system of claim 34, wherein said program information is superimposed on top of said progress bar.

36. The system of claim 19, wherein said second portion has a smaller vertical dimension than does said first portion.

37. The system of claim 19, wherein said progress bar further comprises one or more additional portions, wherein each of said one or more additional portions has a distinct color from said first and second colors, wherein each of said one or more additional portions provides additional information about said recorded media content.

38. The system of claim 19, wherein said number of applications includes a personal video recording (PVR) application configured to generate said progress bar.

39. The system of claim 19, wherein said media content comprises a number of media content instances.

40. A graphical user interface (GUI) displayed on a display device said GUI comprising a progress bar, said progress bar comprising:

a first portion, said first portion graphically representing the duration of said recorded media content having a beginning and end time and having a first color; and a second portion having a second color, said second portion graphically representing a section of said recorded media content that is viewed during a viewing session;

wherein said second color is distinct from said first color; and wherein said second portion graphically tracks a navigation through said recorded media content being viewed in a trick mode.

41. The GUI of claim 40, wherein said progress bar further comprises a third portion having a third color, said third portion graphically representing a section of said recorded media content that is designated for editing, wherein said third color is distinct from said first and second colors.

42. The GUI of claim 41, wherein said progress bar further comprises a fourth portion having a fourth color, said fourth portion graphically representing a deleted section of said recorded media content, wherein said fourth color is distinct from said first, second, and third colors.

43. The GUI of claim 40 wherein the length of said second portion shrinks when said recorded media content is rewound.

44. The GUI of claim 40, wherein the length of said second portion increases when said recorded media content is fast forwarded.

45. The GUI of claim 40, wherein said progress bar further comprises a fifth portion having a fifth color, said fifth portion graphically representing an entire section of said recorded media content that is viewed, wherein said fifth color is distinct from said first and second colors.

46. The GUI of claim 40, wherein said progress bar further comprises a sixth portion having a sixth color, said sixth portion graphically representing unrecorded media content, wherein said sixth color is distinct from said first and second colors.

47. The GUI of claim 46, wherein said unrecorded media content is caused by a signal drop-out.

48. The GUI of claim 46, wherein said unrecorded media content corresponds to one or more time periods within said beginning and end times of said recorded media content.

49. The GUI of claim 40, wherein said section of said recorded media content that is viewed during said viewing session starts at said beginning time of said recorded media content.

50. The GUI of claim 40, wherein said section of said recorded media content that is viewed during a viewing session starts at an entry point that is sequentially after said beginning time of said recorded media content.

51. The GUI of claim 40, further comprising a time scale.

52. The GUI of claim 40, wherein said progress bar further comprises program information corresponding to said recorded media content.

53. The GUI of claim 52, wherein said program information is superimposed on top of said progress bar.

54. The GUI of claim 40, wherein said second portion has a smaller vertical dimension than does said first portion.

55. The GUI of claim 40, wherein said progress bar further comprises one or more additional portions, wherein each of said one or more additional portions has a distinct color from said first and second colors, wherein each of said one or more additional portions provides additional information about said recorded media content.

56. A system of providing information about recorded media content having a beginning and end time, said system comprising:

means for displaying a progress bar having a first portion, said first portion graphically representing the duration of said recorded media content and having a first color;

means for displaying a second portion having a second color in said progress bar, said second portion graphically representing a section of said recorded media content that is viewed during a viewing session, wherein said second color is distinct from said first color; and means for graphically tracking a navigation through said recorded media content being viewed in a trick mode.

57. The system of claim 56, further comprising:

means for displaying a third portion having a third color in said progress bar, said third portion graphically representing a section of said recorded media content that is designated for editing;

wherein said third color is distinct from said first and second colors.

58. The system of claim 57, further comprising:

means for displaying a fourth portion having a fourth color in said progress bar, said fourth portion graphically representing a deleted section of said recorded media content;

wherein said fourth color is distinct from said first, second, and third colors.

59. The system of claim 56, further comprising means for shrinking the length of said second portion when said recorded media content is rewound.

60. The system of claim 56, further comprising means for increasing the length of said second portion when said recorded media content is fast forwarded.

61. The system of claim 56, further comprising:

means for displaying a fifth portion having a fifth color in said progress bar, said fifth portion graphically representing an entire section of said recorded media content that is viewed;

wherein said fifth color is distinct from said first and second colors.

62. The system of claim 56, further comprising:

means for displaying a sixth portion having a sixth color in said progress bar, said sixth portion graphically representing unrecorded media content;

wherein said sixth color is distinct from said first and second colors.

63. The system of claim 56, further comprising means for displaying program information corresponding to said recorded media content.

64. The system of claim 56, further comprising:

means for displaying one or more additional portions in said progress bar;

wherein each of said one or more additional portions has a distinct color from said first and second colors, wherein each of said one or more additional portions provides additional information about said recorded media content.

* * * * *

UNITED STATES PATENT AND TRADEMARK OFFICE
CERTIFICATE OF CORRECTION

PATENT NO.        : 7,290,698 B2  
APPLICATION NO.   : 10/925546  
DATED             : November 6, 2007  
INVENTOR(S)       : Thomas Poslinski and Kim Annon Ryal Page 1 of 1

It is certified that error appears in the above-identified patent and that said Letters Patent is hereby corrected as shown below:

Column 12, Line 4, Claim 7, change "is caused by a signs drop-out" to --is caused by a signal drop-out--

Signed and Sealed this

Thirteenth Day of May, 2008

JON W. DUDAS  
*Director of the United States Patent and Trademark Office*